Sept. 17, 1940.  D. B. BAKER ET AL  2,214,805
TRACTOR TRANSMISSION
Filed Dec. 27, 1937  4 Sheets-Sheet 3

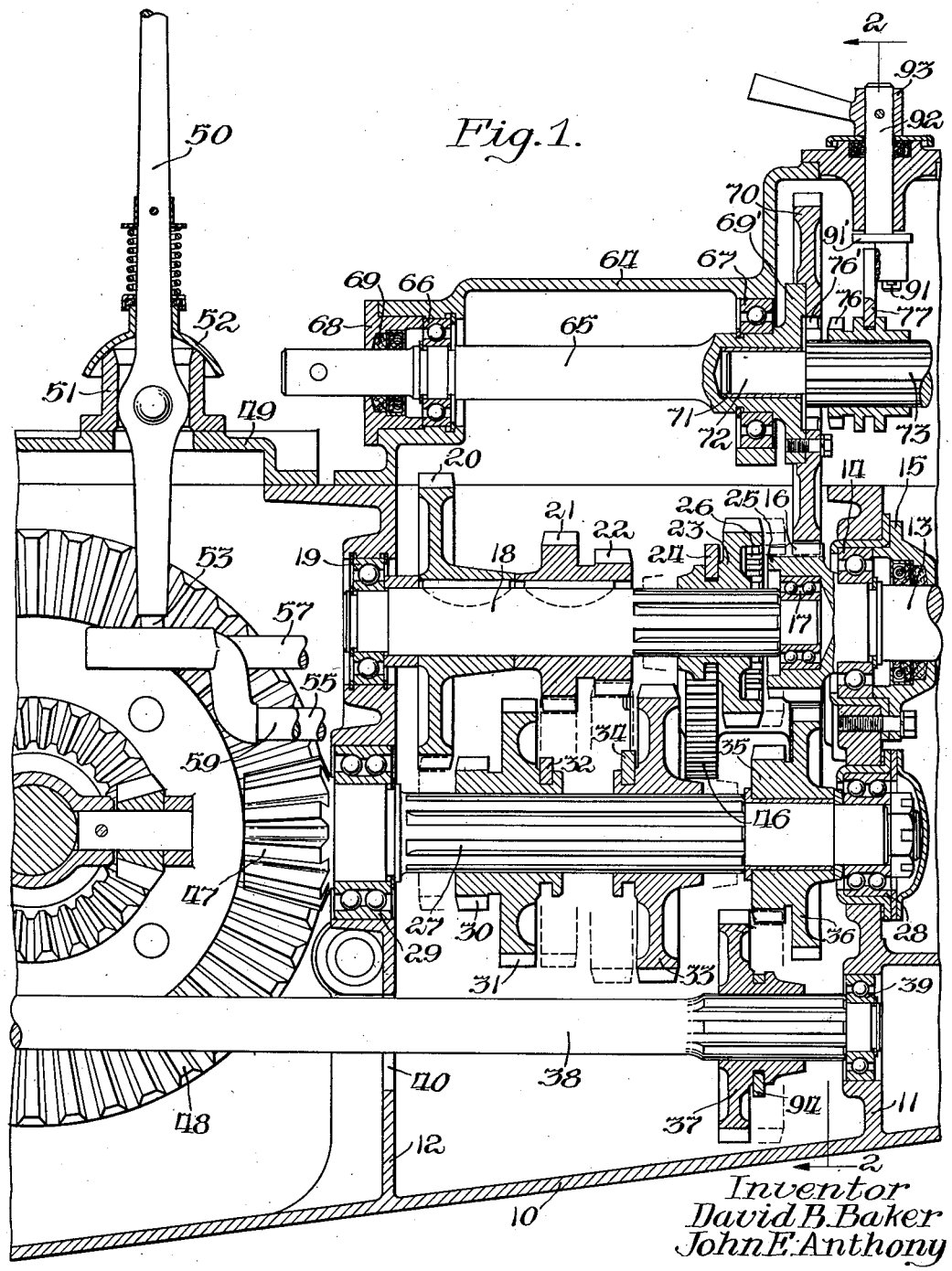

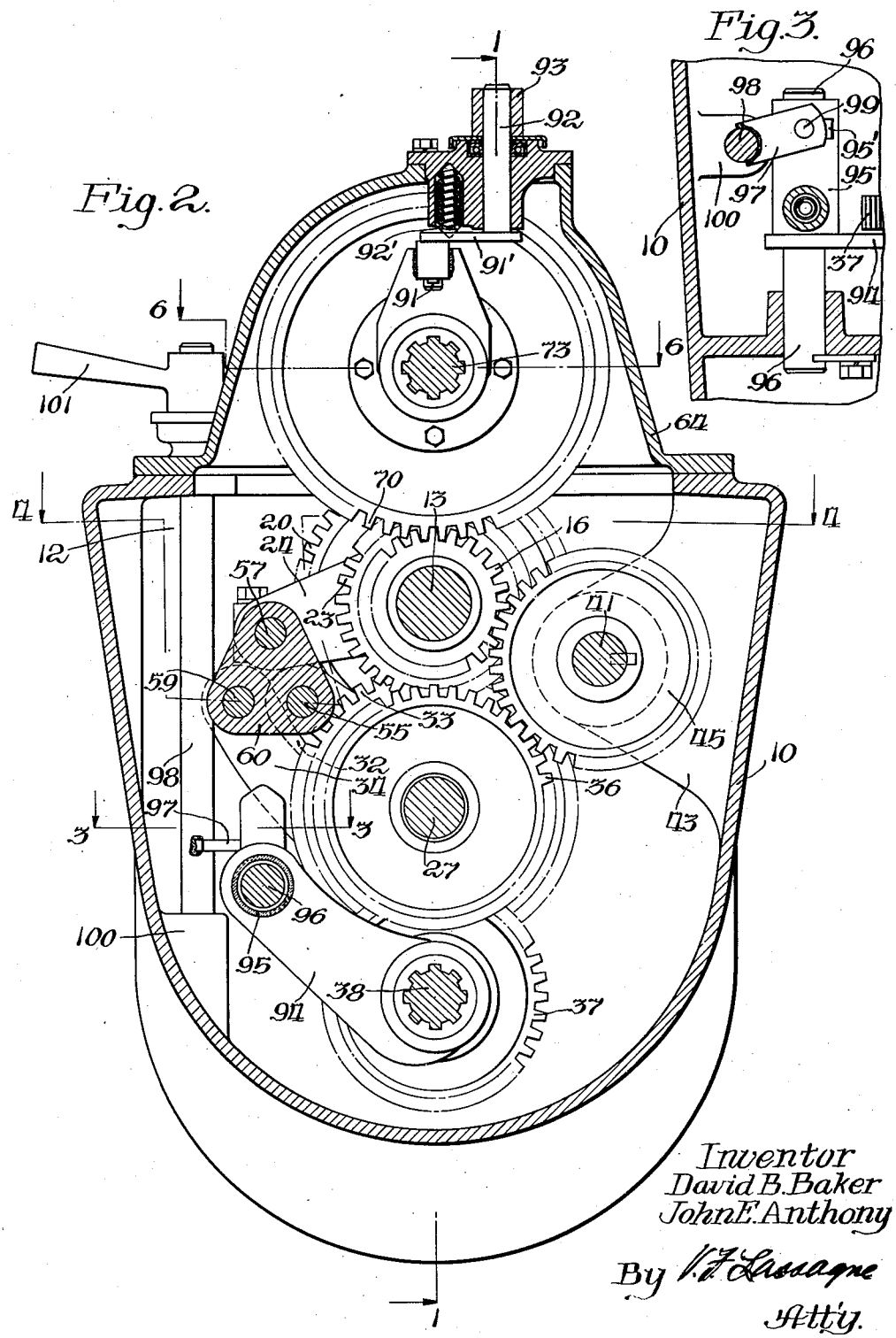

Inventor
David B. Baker
John E. Anthony
By V. F. Lusagne
Atty.

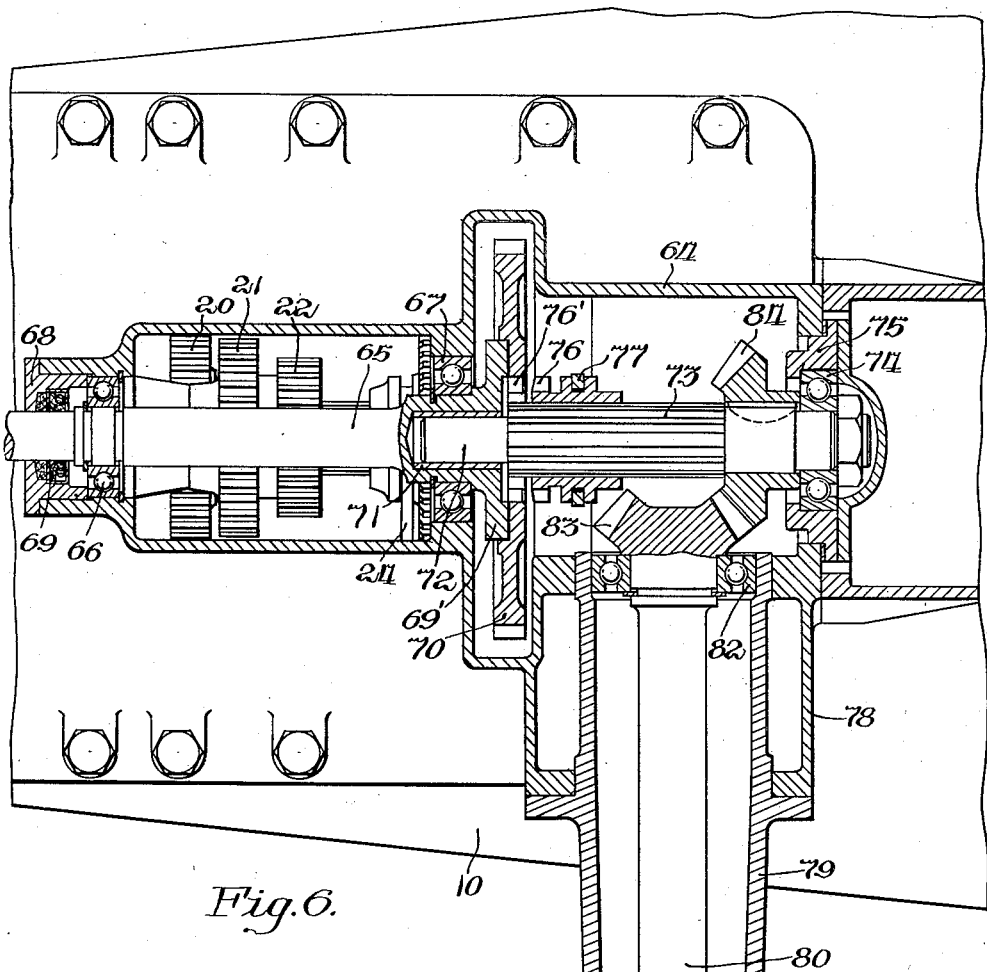
Fig.6.
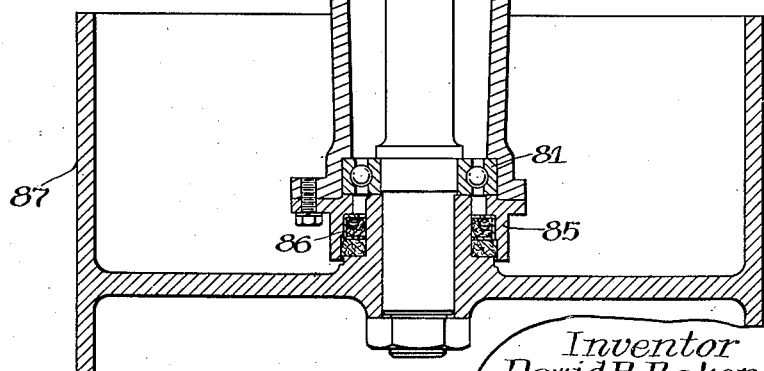
Inventor
David B. Baker
John E. Anthony
By V. F. Lasagne
Att'y.

Patented Sept. 17, 1940

2,214,805

UNITED STATES PATENT OFFICE 2,214,805

TRACTOR TRANSMISSION

David B. Baker, Riverside, and John E. Anthony, Western Springs, Ill., assignors to International Harvester Company, a corporation of New Jersey Application December 27, 1937, Serial No. 181,727

11 Claims. (Cl. 74—326)

This invention relates to power transmission mechanisms. More particularly it relates to a transmission for a tractor designed to supply power to the final drive mechanism and for power take-off purposes.

Tractor transmissions are especially designed to perform these desired functions. Ordinarily no direct drive is provided for, as the tractor speeds are ordinarily low and as power is relatively more important than speed. Another feature which distinguishes tractor transmissions from other automotive transmissions is the provision of power take-off means. Tractors are at the present time almost universally provided with a power take-off shaft extending rearwardly for supplying power to implements carried on the tractor or pulled behind the tractor. Tractors are also always provided with a power take-off pulley usually arranged on a transverse shaft at the side of the tractor. For special purposes, other power take-off shafts are sometimes provided.

The chief object of the present invention is to provide an improved tractor transmission incorporating the required power take-off devices.

Another object is to provide a transmission having a large number of different speeds with a minimum number of gears arranged to occupy a minimum amount of space, both as to length and breadth of the transmission.

Another object is to provide a single control lever and gear shifting mechanism of a simplified construction operative to engage and disengage a plurality of change speed gears.

These above objects and others, which will be apparent from the detailed description to follow, are attained by a construction such as shown in the drawings, in which the basic arrangement consists of a main driving shaft and a parallel driven shaft. The main shaft receives power from the clutch shaft of the tractor and the driven shaft delivers power to a differential assembly, which is a part of the final drive mechanism. In addition to these main features and the stationary and established gears carried thereby, a third parallel shaft is provided with gears engageable both with gears on the driving and driven shafts. Said third shaft and the gears carried thereby provide an auxiliary speed change and also provide a reverse drive, as power may be transmitted from the driving shaft to the auxiliary shaft and either back to the driving shaft or directly to the driven shaft whereby a reverse rotation is imparted to the driven shaft. Two power takeoff shafts are also provided, one shaft lying below the transmission and being driven by disengageable gearing from the input shaft from the clutch. To deliver power downwardly to the lower power take-off shaft, a gear cluster is floatingly carried on the driven shaft. Power is transmitted from the main input shaft to said gear cluster indirectly through a gear mounted on the auxiliary shaft.

A second power take-off shaft located above the transmission is also driven from the input shaft from the clutch. A power take-off shaft for the pulley is arranged at right angles to said second power take-off shaft, being driven therefrom by beveled gears and a disengageable positive clutch. Means extending outside of the transmission are provided for disengaging the driving means to the lower power take-off shaft and to the pulley shaft.

By means of the construction previously described, a compact simplified transmission is constructed which provides a large number of gear ratio changes and also provides for the take-off of power at three different locations. The transmission is of a minimum length and is narrow in width, a feature very desirable on row crop tractors, which are in wide use at the present time.

In the drawings:

Figure 1 is a longitudinal vertical section through the center line of a transmission embodying the invention; and, in order to correlate the different views, Figure 1 may be considered as a section on the line 1—1 of Figure 2;

Figure 2 is a section taken on the line 2—2 of Figure 1 showing an entire transverse vertical section;

Figure 3 is a section taken on the line 3—3 of Figure 2 showing a portion of the gear shifter mechanism;

Figure 4:
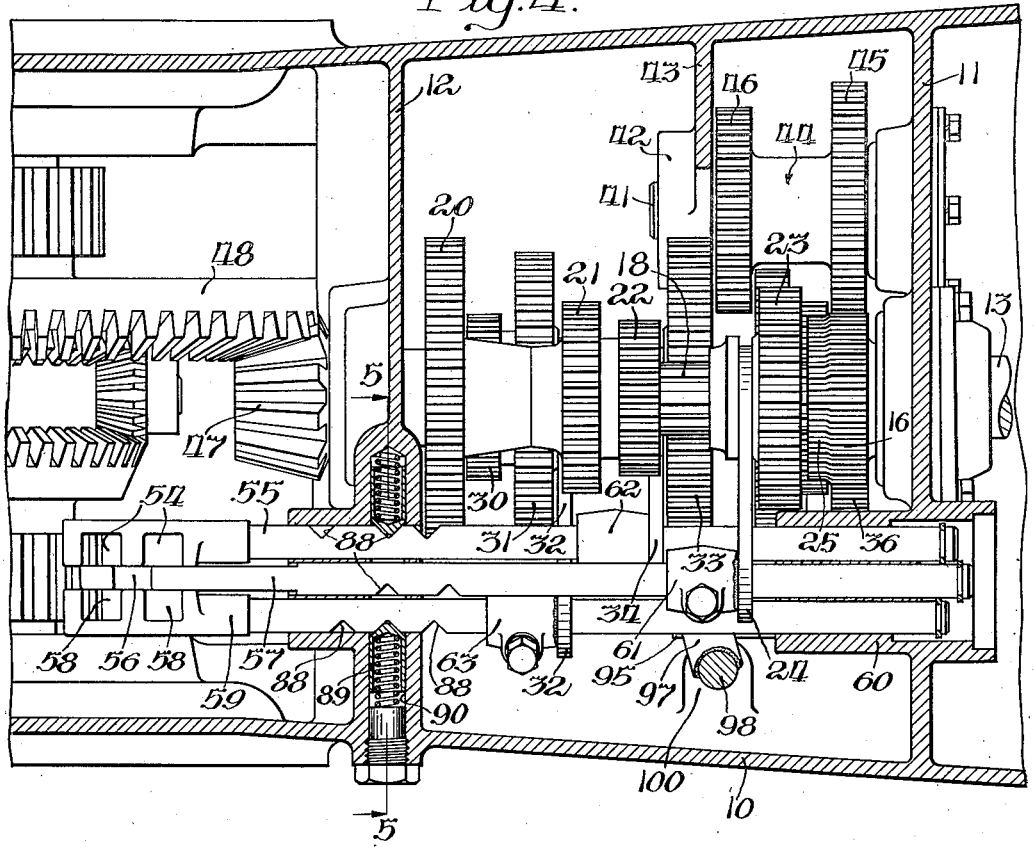
Figure 4 is a section taken on the line 4—4 of Figure 2 with the gears and shafts in the transmission shown in plan view.
Figure 5:
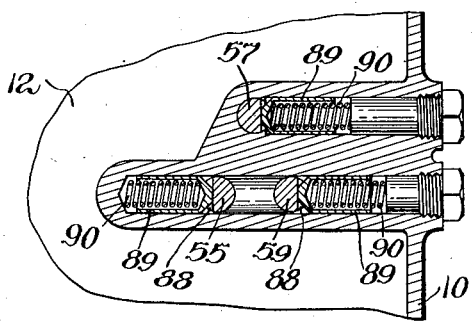

Figure 5 is a section taken on the line 5—5 of Figure 4 showing the relative positions and the detent mechanisms for the shifter rods; and, Figure 6 is a horizontal section through the center of the pulley shaft showing the final drive mechanism for the pulley shaft and the upper power take-off shaft. For the purpose of correlating the drawings, this figure may be considered as a section taken on the line 6—6 of Figure 2.

The drawings show only the transmission housing portion of an integral casing 10, which is formed as a casting. A type of tractor in wide use at the present time is provided with a cast rear end casing, as shown, which includes the transmission, the differential drive mechanism and sometimes a portion of the axle housings.

For the purposes of this application, only the center section of such a casing has been illustrated. Said casing is divided by a transverse vertical wall 11 and a transverse vertical wall 12 to form a compartment for housing the transmission. Said walls are provided with openings and reenforcing flanges around the openings to support ball bearing assemblies for the shafts incorporated in the transmission. From the clutch of the tractor, which has not been shown, a main drive shaft 13 extends through the forward wall 11 of the transmission, being rotatably mounted thereon by a ball bearing assembly 14. Suitable oil seals are provided for said shafts, said oil seals being carried by a flanged closure member 15 surrounding the shaft 13 forwardly of the end wall 11. Immediately inside the end wall 11, the shaft 13 is formed with an enlarged end portion provided with teeth to form a drive gear 16. The enlarged end of the shaft is provided with a cylindrical recess in which a ball bearing assembly 17 is fitted to rotatably support one end of a drive shaft 18. The rear end of said shaft is rotatably supported by a ball bearing assembly 19 carried by the rear end wall 12.

Adjacent the rear end of the shaft, a drive gear 20, of a large radius, is rigidly keyed to the shaft. Forwardly of the gear 20, a gear cluster is keyed to the shaft; said cluster including a medium size gear 21 and a gear 22 of a very small radius. From the gear 22 to the end of the shaft, splines are formed on which an internally splined gear 23 is slidably mounted. Said gear is formed on the hub portion with an annular recess engaged by a shifter fork 24, which will be further described in connection with the shifting mechanism.

In addition to the gear 16 formed on the enlarged end of the shaft 13, a positive jaw clutch 25 is formed on the enlarged end. Said clutch is adapted to engage an internally formed clutch element 26 formed in a recessed portion of the gear 23. It will be understood that the gear 23 may be shifted to engage the positive clutch consisting of the clutch elements 25 and 26, whereby the driving shaft 18 is rotated with the drive shaft 13.

Spaced below the drive shaft 18, a main driven shaft 27 is rotatably mounted in the end wall 11 by a ball bearing assembly 28 and in the end wall 12 by a ball bearing assembly 29.

The shaft 27 is splined throughout the major portion of its length. A gear cluster splined on the rear end of the shaft includes a relatively small gear 30 adapted to engage the gear 20 on the driving shaft 18 and a relatively large gear 31 adapted to engage the gear 21 on the driving shaft. A shifter fork 32 engages an annular recess formed on the gear cluster adjacent the gear 31. The operation of the shifting fork will be further described in connection with the shifting mechanism. A relatively large gear 33 is also splined on the driven shaft 27. Said gear is adapted to engage the small gear 22 on the driving shaft 18. A shifter fork 34 engaging an annular recess formed on the hub of the gear 30 is provided for shifting said gear. This shifter fork will be further described in connection with the shifter mechanism.

Adjacent the wall 11 of the transmission casing, the shaft 27 is formed with a plain bearing surface, on which a gear cluster is mounted for free rotation, or as might be termed for floating movement, insofar as rotation of the shaft 27 is concerned. Said gear cluster includes one gear 35 and a gear 36 substantially larger in diameter. The gear 35 is positioned to be engaged by a shiftable gear 37 splined on the front end of a power take-off shaft 38. The forward end of said shaft is rotatably mounted on a ball bearing assembly 39 carried by the end wall 11. The shaft extends rearwardly through the differential housing and is supported in any conventional manner at the rear of the differential housing. It will be noted that the shaft 38, as shown in Figure 1, extends through an opening 40 formed in the rear end wall 12. Said opening provides for the free flow of lubricant between the transmission casing and the differential casing.

At one side of the driving shaft 18 and somewhat lower than said shaft, an auxiliary driving shaft 41 is rotatably mounted in a bearing formed on the rear end wall 11 and in a bearing portion 42 of a web 43 extending inwardly from the side wall of the main casing 10. Said shaft forms a support for a gear cluster 44. Said cluster includes a gear 45 which, as best shown in Figure 2 and also shown in Figure 4, is in constant mesh with the gear 16 on the main drive shaft 13. The gear 45 is also in constant mesh with the gear 36, whereby the gear 36 and the gear 35 carried therewith constantly rotates on the shaft 27.

The gear cluster 44 also carries a gear 46. Said gear may be engaged either by the gear 23 on the driving shaft 18 or by the gear 33 on the driven shaft 27.

The top of the casing 10 is open both above the transmission and above the differential housing. The driven shaft 27 is formed within the differential casing at the rear of the end wall 12 with a beveled pinion gear 47. Said gear meshes with a beveled ring gear 48, which forms driving means for the differential assembly. Said parts of the differential assembly have been shown in the drawings, but will not be described in detail as they do not form a part of the present invention.

A cast cover 49, adapted to cover the casing 10 above the differential, includes means for mounting a gear shifter lever 50. Said lever is mounted on a universal ball joint carried by a member 51 secured to the top of the cover 49 over an opening therein through which the lever 50 extends. Spring pressed means including a spherical shield 52 prevent the escape of lubricant around the lever 50.

The lower end 53 of the shifting lever 50 is adapted to engage spaced notches 54 formed in the end portion of a shifter rod 55, a notch 56 in the end of a center shifter rod 57 or spaced notches 58 in the end of a shifter rod 59. The shifter rod 57 is located vertically above the shifter rods 55 and 59 which lie in substantially the same horizontal plane. Figure 5 best shows this construction. In order to bring the end portion of the shifter rods 55 and 59 on the same horizontal level as the rod 57, the rear end portions of the rods, which contain the notches, are bent upwardly, as best shown in Figure 1. The shifter rod 57, which lies, in the center between the other two rods, extends rearwardly through a bearing formed in the end wall 12, as best shown in Figure 5, and rearwardly where it is supported in an alined bearing formed by a boss 60 on the forward end wall 11. A collar 61, as best shown in Figure 4, is rigidly clamped to the shifter rod 57. The shifter fork 24, which has previously been referred to, is welded or otherwise permanently secured to the collar 61. With the lever 50 in a central position, the shifter rod 57 may be moved forwardly or rearwardly by moving the lever in the opposite direction. When the lever is in the position shown in Figure 1, that is, at its center position, the shifter rod 57 is in the position shown in Figure 4. When the lever 50 is moved rearwardly, the gear 23 is moved forwardly, thereby engaging the clutch elements 25 and 26 and forming a direct drive between the input shaft 13 and the shaft 18. The lever in the rear center position with the shifter rod 57 in its forward position forms one neutral position. The lower end 53 of the shifter lever 50 is then in position to be moved laterally to engage the forward notch 54 on the shifter rod 55 or the forward notch 58 on the shifter rod 59. Consider that the lever 50 has been moved first rearwardly and then toward the right, the lower end 53 moves toward the left engaging the forward notch 54. The shifter rod 55, which is slidably mounted in the boss 60, previously referred to, carries a collar 62 to which the shifter fork 34 is rigidly secured. After movement to the right in this position, the lever 50 may be moved rearwardly to move the rod 55 forwardly and to thereby engage the gear 33 with the gear 46 on the auxiliary shaft 41. This gives a reverse speed as drive power is transmitted to the gear 16, to the gear 45 and through the gear 46 to the gear 33. When the shifter lever 50 is moved forwardly from this position at the right, the shifter 34 moves the gear 33 rearwardly into mesh with the gear 22. Power is then transmitted to the driven shaft 27 from the driving shaft 18 at the speed ratio determined by the relative diameter of the gears 22 and 33.

When the shifter lever 50 is moved to the left with the shifter rod 57 in its forward position, the lower end 53 of the lever engages the forward notch on the shifter rod 59. Following this movement by movement to the rear of the lever 50, the shifter rod 59 is moved forwardly. Said rod carries a collar 63 to which the shifter fork 32 is rigidly connected. By forward movement, said shifter fork moves the gear 31 into mesh with the gear 21. The driving shaft 18 then transmits motion to the shaft 27 at the speed ratio determined by the relative diameters of the gears 21 and 31. When the shifter rod 50 is moved forwardly in this position, the gear 30 is brought into mesh with the gear 20 forming another gear ratio for driving the shaft 27.

As above described, when the shifter rod 50 is in its rear neutral position, four gear ratios can be established, one of them being reversed when power is transmitted to a gear on the auxiliary shaft and therefrom directly to the drive shaft 27. The operation of the transmission with the drive shaft 13 clutched to the drive shaft 18 is very similar to many conventional transmissions, it being considered that in this case the auxiliary shaft 41 acts as the reverse idler conventionally used.

The gear shift lever 50 in its central position, insofar as lateral movement is concerned, may be moved forwardly to move the shifter rod 57 to the rear, to the extent that the notch 56 lines up transversely with the rear notch 54 and the rear notch 58. In this position, the gear 23 meshes with the gear 46 on the auxiliary shaft whereby the driving shaft 18 is continually driven at a speed ratio depending upon the relative diameters of the gears 60, 45, 46 and 23. With the gear shift lever in this position, the rear notch 58 and the rear notch 54 may be engaged exactly the same as the forward notches 54 and 58 as above described. All of the forward speeds may be engaged by the same movements. The ratios of the shaft speeds obtained are the same as between the shafts 18 and 27. As the ratios between the shaft 18 and the shaft 13 are altered, different resultant speeds are obtained. It will be understood, however, that the reverse speed obtained with the gear shift lever in this position is the same as with the gear shift lever in the position previously described, as the reverse is transmitted directly through the gears 45 and 46 on the auxiliary shaft to the gear 33 on the driven shaft 27.

It should be kept in mind that shifting of the gears to obtain the different ratios between the shafts 18 and 20, and to obtain the different ratios between the shafts 13 and 18 does not effect the transmission of power to the take-off shaft 38, as the drive for this shaft is directly taken off the gear 16 on the main input shaft 13.

A cast housing 64 is mounted above the transmission at the open top of the casing 10. Said housing forms a support for a longitudinally extending power take-off shaft 65, which is rotatably supported in ball bearing assemblies 66 and 67 carried by the housing. The rear end of the shaft 65 extends rearwardly through a closure 68, which carries a seal 69. The exposed end of the shaft may be utilized for transmitting power to any mechanism where power is desired. Forwardly of the bearing assembly 67, the shaft 65 is provided with a flanged end 69', which is secured to a gear 70. Said gear is in mesh with the gear 16 and is constantly driven thereby.

As shown in Figure 1 and more completely in Figure 5, the end portion of the shaft 65 is provided with a bore 71 to form a pilot bearing support for a stub end 72 of a splined shaft 73. The other end of said shaft is supported by a ball bearing assembly 74 mounted in a bearing support 75 secured to the housing 64. A positive clutch member 76 splined on the shaft 73 is movable by a shifter fork 77 into engagement with a mating clutch element comprising teeth 76' formed on the center portion of the gear 70.

The housing 64 is formed with a lateral extension 78 in which a pulley shaft supporting housing 79 is fitted and supported. A pulley shaft 80 is mounted in said housing, being supported adjacent the outer end of the housing by a ball bearing assembly 81 and at the inner end of the housing by a ball bearing assembly 82. The inner end of the shaft 80 is formed with a beveled gear 83, which is in driving engagement with a beveled gear 84 keyed to the shaft 73. A retainer member 85 holds the bearing assembly 81 in position at the outer end of the pulley shaft housing 79 and forms means for positioning an oil seal 86. A belt pulley 87 is secured to the extending end of the shaft 80 for rotation therewith.

Referring to Figures 4 and 5, it will be noted that the shifter rods 55, 57 and 59 are provided with detent notches 88. Separate detents 89 for each rod are urged by springs 90 against the notches 88. This is a conventional means for retaining the shifter rods in different positions of adjustment.

The operaion of the elements of the transmission, as above described, has been explained in connection with the description. A compact transmission has been obtained by the arrangement, as described, with a minimum number of gears to obtain the six forward speeds and one reverse and the independent operation of two power take-off shafts, one located above the transmission and the other located below the transmission. The operation of the gear shift lever 50 has been completely explained. For shifting the clutch for the pulley shaft into and out of operation, the shifter fork 77 is mounted eccentrically on a stub end shaft 91 carried by a crank arm 91' on a vertical shaft 92. A spring pressed detent 92' provides latch means for holding the shifter fork in its adjusted positions.

A lever arm 93 illustrates means which may be utilized for shifting the clutch member 76.

For shifting the gear 37 into engagement with the gear 35 for putting the power take-off shaft 38 into operation, a shifter fork 94, engaging an annular recess formed on the hub of the gear 37, is secured to a sleeve 95 slidably mounted on a shaft 96. The shaft 96 is mounted in the casing 10, as shown in Figures 3 and 4. A horizontally projecting arm 97 rigidly secured to a vertical shaft 98 is engageable with a pin 99 which slidably engages a slot 95' in the sleeve 95. By oscillation of the shaft 98, the shifter fork 94 may be moved to engage or disengage the gear 37. The vertical shaft 98 is rotatably mounted at the bottom of the casing in a boss 100 and extends through the housing 64. A lever arm 101 is illustrated as providing a means for operating the shifter 98.

It is to be understood that applicants have shown and described only a preferred embodiment of their improved transmission for tractors, and that they claim as their invention all modifications falling within the scope of the appended claims.

What is claimed is:

1. In a transmission for tractors, and in combination, a casing, a drive shaft rotatably mounted in said casing, said shaft carrying a gear at one end thereof, a driving shaft rotatably mounted in the casing in axial alinement with said drive shaft, a driven shaft rotatably mounted in the casing parallel to the driving shaft, a plurality of selectable gears connecting said driving and driven shafts, an auxiliary shaft parallel to the driving shaft, two gears mounted for rotation together on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, a toothed gear element mounted for rotation on the driven shaft, said element meshing with one of the gears on the auxiliary shaft, a power take-off shaft arranged parallel to the driving shaft, and a gear mounted on said shaft, said gear meshing with the toothed gear element on the driven shaft.

2. In a transmission for tractors, and in combination, a casing, a drive shaft rotatably mounted in said casing, said shaft carrying a gear at one end thereof, a driving shaft rotatably mounted in the casing in axial alinement with said drive shaft, a driven shaft rotatably mounted in the casing parallel to the driving shaft, a plurality of selectable gears connecting said driving and driven shafts, an auxiliary shaft parallel to the driving shaft, two gears mounted for rotation together on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, a toothed gear element mounted for rotation on the driven shaft, said element meshing with one of the gears on the auxiliary shaft, a power take-off shaft arranged parallel to the driving shaft, a gear mounted on said shaft, said gear meshing wtih the toothed gear element on the driven shaft, a second power take-off mounted above the driving shaft, and a gear on said shaft in mesh with the gear on the drive shaft.

3. In a transmission for tractors, and in combination, a casing, a drive shaft rotatably mounted in said casing, said shaft carrying a gear at one end thereof, a driving shaft rotatably mounted in the casing in axial alinement with said drive shaft, a driven shaft rotatably mounted in the casing parallel to the driving shaft, a plurality of selectable gears connecting said driving and driven shafts, an auxiliary shaft parallel to the driving shaft, two gears mounted for rotation together on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, two gears mounted for rotation together on the driven shaft, one of said gears being in mesh with one of the gears on the auxiliary shaft, a power take-off shaft arranged parallel to the driving shaft, and a gear slidably and non-rotatably mounted on said shaft, said gear being engageable with one of the gears on the driven shaft.

4. In a transmission for tractors, and in combination, a casing, a drive shaft rotatably mounted in said casing, said shaft carrying a gear at one end thereof, a driving shaft rotatably mounted in the casing in axial alinement with said drive shaft, a driven shaft rotatably mounted in the casing parallel to the driving shaft, a plurality of selectable gears connecting said driving and driven shafts, an auxiliary shaft parallel to the driving shaft, two gears mounted for rotation together on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, two gears mounted for rotation together on the driven shaft, one of said gears being in mesh with one of the gears on the auxiliary shaft, a power take-off shaft arranged parallel to the driving shaft, a gear slidably and non-rotatably mounted on said shaft, said gear being engageable with one of the gears on the driven shaft, a second power take-off mounted above the driving shaft and parallel thereto, and a gear on said shaft in mesh with the gear on the drive shaft.

5. In a transmission for tractors, and in combination, a casing, a drive shaft rotatably mounted in said casing for receiving power from the tractor motor, said shaft being formed with a gear at one end thereof, a driving shaft rotatably mounted in the casing in axial alinement with said drive shaft, a driven shaft rotatably mounted in the casing parallel to the driving shaft, means for transmitting power from said driven shaft to the final drive mechanism of the tractor, a plurality of gears fixed on the driving shaft and a gear slidably and nonrotatably mounted thereon, a plurality of gears nonrotatably and slidably mounted on the driven shaft, means for shifting said gears for engaging pairs of said gears on the respective shafts, an auxiliary shaft parallel to the driving shaft, and a gear cluster including two gears rotatably mounted on said shaft, one of said gears being engageable with the shiftable gear on the driving shaft, said gear on the auxiliary shaft being also engageable with one of the shiftable gears on the driven shaft, the other gear on the auxiliary shaft being in mesh with the gear on the drive shaft for continuous rotation therewith.

6. In a transmission for tractors, and in combination, a casing, a drive shaft rotatably mounted in said casing for receiving power from the tractor motor, said shaft being formed with a gear at one end thereof, a driving shaft rotatably mounted in the casing in axial alinement with said drive shaft, a driven shaft rotatably mounted in the casing parallel to the driving shaft, means for transmitting power from said driven shaft to the final drive mechanism of the tractor, a plurality of gears fixed on the driving shaft and a gear slidably and nonrotatably mounted thereon, a plurality of gears nonrotatably and slidably mounted on the driven shaft, means for shifting said gears for engaging pairs of said gears on the respective shafts, an auxiliary shaft parallel to the driving shaft, and a gear cluster including two gears rotatably mounted on said shaft, one of said gears being engageable with the shiftable gear on the driving shaft, said gear on the auxiliary shaft being also engageable with one of the shiftable gears on the driven shaft, the other gear on the auxiliary shaft being in mesh with the gear on the drive shaft for continuous rotation therewith, and means for directly coupling the drive shaft to the driving shaft.

7. In a transmission for tractors, and in combination, a casing, a drive shaft rotatably mounted in said casing for receiving power from the tractor motor, said shaft being formed with a gear at one end thereof, a driving shaft rotatably mounted in the casing in axial alinement with said drive shaft, a driven shaft rotatably mounted in the casing parallel to the driving shaft, means for transmitting power from said driven shaft to the final drive mechanism of the tractor, a plurality of gears carried by the driving shaft, a plurality of gears nonrotatably and slidably mounted on the driven shaft, means for shifting said gears for engaging pairs of said gears on the respective shafts, an auxiliary shaft parallel to the driving shaft, and a gear cluster including two gears rotatably mounted on said shaft, one of said gears being engageable with one of the gears on the driving shaft, said gear on the auxiliary shaft being also engageable with one of the shiftable gears on the driven shaft, the other gear on the auxiliary shaft being in mesh with the gear on the drive shaft for continuous rotation therewith, means for directly coupling the drive shaft to the driving shaft, a gear cluster rotatably mounted on the driven shaft including two gears, one of said gears being in mesh with one of the gears on the auxiliary shaft, a power take-off shaft arranged parallel to the driving shaft, a gear slidably and nonrotatably mounted on said shaft, said gear being engageable with one of the gears of the cluster on the driven shaft, a second power take-off shaft mounted above the driving shaft and parallel thereto, and a gear on said shaft in mesh with the gear on the drive shaft.

8. In a transmission, the combination of a casing having spaced end walls, a drive shaft rotatably mounted in one end wall of said casing, said shaft being formed with a gear at one end thereof adjacent the end wall, a driving shaft rotatably mounted in the casing in axial alinement with said drive shaft being supported at one end by the drive and at the other end by one of the end walls of the casing, a driven shaft rotatably carried by the end walls of the casing parallel to the driving shaft, a plurality of gears nonrotatably mounted on the driving shaft, a plurality of gears nonrotatably mounted on the driven shaft, means for engaging pairs of said gears on the respective shafts, an auxiliary shaft carried by the casing parallel to the driving shaft, and a gear cluster including two gears rotatably mounted on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft.

9. In a transmission, the combination of a casing having spaced end walls, a drive shaft rotatably mounted in one end wall of said casing, said shaft being formed with a gear at one end thereof adjacent the end wall, a driving shaft rotatably mounted in the casing in axial alinement with said drive shaft being supported at one end by the drive shaft and at the other end by one of the end walls of the casing, a driven shaft rotatably carried by the end walls of the casing parallel to the driving shaft, a plurality of gears nonrotatably mounted on the driving shaft, a plurality of gears nonrotatably mounted on the driven shaft, means for engaging pairs of said gears on the respective shafts, an auxiliary shaft carried by the casing parallel to the driving shaft, a gear cluster including two gears rotatably mounted on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, a gear cluster rotatably mounted on the driven shaft including two gears, one of said gears being in mesh with one of the gears on the auxiliary shaft, a power take-off shaft supported at one end by one of the end walls of the casing and arranged parallel to the driving shaft, and a gear on the shaft engageable with one of the gears of the cluster on the driven shaft.

10. In a transmission for tractors, and in combination, a casing, a drive shaft rotatably mounted in said casing for receiving power from the tractor motor, said shaft being formed with a gear at one end thereof, a driving shaft rotatably mounted in the casing in axial alinement with said drive shaft, a driven shaft rotatably mounted in the casing parallel to the driving shaft, means for transmitting power from said driven shaft t he final drive mechanism of the tractor, a plurality of gears fixed on the driving shaft, a plurality of gears nonrotatably and slidably mounted on the driven shaft, means for shifting said gears to engage pairs of said gears on the respective shafts, an auxiliary shaft parallel to the driving shaft, and a gear cluster including two gears rotatably mounted on said shaft, one of said gears being engageable with one of the shiftable gears on the driving shaft, said gear on the auxiliary shaft being also engageable with one of the shiftable gears on the driven shaft, the other gear on the auxiliary shaft being in mesh with the gear on the drive shaft for continuous rotation therewith, means for directly coupling the drive shaft to the driving shaft, a gear cluster rotatably mounted on the driven shaft including two gears, one of said gears being in mesh with one of the gears on the auxiliary shaft, a power take-off shaft arranged parallel to the driving shaft, a gear slidably and nonrotatably mounted on said shaft, said gear being engageable with one of the gears of the cluster rotatable on the driven shaft.

11. In a transmission, the combination of a casing having spaced end walls, a drive shaft rotatably mounted in one end wall of said casing, said shaft being formed with a gear at one end thereof adjacent the end wall, a driving shaft rotatably mounted in the casing in axial alinement with said drive shaft being supported at one end by the drive shaft and at the other end by one of the end walls of the casing, a driven shaft rotatably carried by the end walls of the casing parallel to the driving shaft, a plurality of gears nonrotatably mounted on the driving shaft, a plurality of gears nonrotatably mounted on the driven shaft, means for engaging pairs of said gears on the respective shafts, an auxiliary shaft carried by the casing parallel to the driving shaft, a gear cluster including two gears rotatably mounted on said shaft, one of said gears being engageable with a gear carried by the driving shaft, said gear on the auxiliary shaft being also engageable with one of the gears on the driven shaft, the other gear on the auxiliary shaft being engageable with the gear on the drive shaft, means for directly coupling the drive shaft to the driving shaft, a gear cluster rotatably mounted on the driven shaft including two gears, one of said gears being in mesh with one of the gears on the auxiliary shaft, a power take-off shaft supported at one end by one of the end walls of the casing and arranged parallel to the driving shaft, a gear on said shaft engageable with one of the gears of the cluster on the driven shaft, a cover for the casing, a second power take-off carried by said cover and mounted above the driving shaft and parallel thereto, and a gear on said shaft in mesh with the gear on the drive shaft.

DAVID B. BAKER.
JOHN E. ANTHONY.